(12) United States Patent
Lantier et al.

(10) Patent No.: US 6,915,606 B2
(45) Date of Patent: Jul. 12, 2005

(54) BAG FOR TRANSPORTING FLOWER AND PLANT BOUQUETS, IN PARTICULAR FOR TRANSPORTING BOUQUETS IN WATER POUCH

(76) Inventors: Nicole Lantier, Le Gouttet, 42370 Saint Haon le Vieux (FR); Pierre Lantier, Le Gouttet, 42370 Saint Haon le Vieux (FR)

( * ) Notice: Subject to any disclaimer, the term of this patent is extended or adjusted under 35 U.S.C. 154(b) by 0 days.

(21) Appl. No.: 10/284,131

(22) Filed: Oct. 31, 2002

(65) Prior Publication Data

US 2004/0083647 A1 May 6, 2004

(51) Int. Cl.$^7$ ................................. A01G 9/02
(52) U.S. Cl. ................. 47/65.8; 47/84; 47/72; 47/41.01; 206/423; 206/117.17; 206/117.24; 206/117.25; 217/122; 383/6; 383/106
(58) Field of Search .................. 53/399, 491, 481, 53/167; 206/425, 423, 457, 779, 780, 575, 116.1, 117.17, 117.24, 117.25; 383/6, 106; 217/122; 428/7; 47/65.8, 66.4, 78, 65.7, 66.3, 66.7, 84, 41.01, 74, 72; 229/117.35, 120, 120.14, 120.15, 120.27, 122

(56) References Cited

U.S. PATENT DOCUMENTS 2,160,551 A * 5/1939 Lupton
2,688,431 A * 9/1954 Loeb et al. .................. 206/423
2,721,022 A * 10/1955 Billerbeck ............. 229/117.15
4,184,595 A * 1/1980 Wackerman ................ 206/423
4,917,240 A    4/1990 Roberts et al. ............. 206/232
5,046,457 A * 9/1991 Ashcroft et al. ............ 119/168
5,235,782 A * 8/1993 Landau ......................... 47/72
6,446,805 B1 * 9/2002 Mann et al. ................ 206/423

FOREIGN PATENT DOCUMENTS

| FR | 2671781 | * 1/1991 | ............ B65D/5/50 |
| GB | 1 280 050 | 7/1972 | |
| GB | 1280050 | * 7/1972 | ........... B65B/25/02 |
| GB | 074542 | * 4/1981 | ........... B65D/30/10 |
| WO | WO 99/54226 | 10/1999 | |

* cited by examiner

Primary Examiner—Peter M. Poon
Assistant Examiner—Andrea M. Valenti
(74) Attorney, Agent, or Firm—Westerman, Hattori, Daniels & Adrian LLP

(57) ABSTRACT

The invention concerns a bag for transporting flower bouquets or plants. It comprises a support for receiving the bouquet or the plant, forming the bottom of the bag, and two substantially parallel lateral portions comprising at least one cutout over at least one of the lateral portions.

17 Claims, 4 Drawing Sheets

BAG FOR TRANSPORTING FLOWER AND PLANT BOUQUETS, IN PARTICULAR FOR TRANSPORTING BOUQUETS IN WATER POUCH

FIELD OF THE INVENTION

The present invention concerns the technical field of bags for transporting plants and flower bouquets, in particular bouquets in a water pouch.

BACKGROUND ART

Flowers and plants are most often transported by hand. During a car trip, for example, they are blocked between the feet or in a rigid box. In most cases, the flowers are crushed, stems are broken, leaves are folded when one steps on the brakes a little abruptly or when one takes a curve.

Flower bouquets are also maintained in water pouches that form a container for the bouquets and ensure their durability with time.

The liquid contained in these pouches is bothersome during trips by car, train or the like (weight, instability, fear of spilling, of breaking the flowers or the stems, etc.).

A flower bag exists in which the paper forming the water pouch is equipped with two handles, which makes it possible to carry the water pouch and the flowers but presses together the flowers as well as on the leaves, and the whole is very unaesthetic.

There is thus a serious and known need for a bag for plants or flower bouquets, in particular in water pouch making it possible to carry them easily without the risk of upsetting the bouquet, breaking, folding, crushing the flowers, the stems or the leaves of a bouquet or of a plant.

SUMMARY OF THE INVENTION

Thus, an object of the present invention concerns a bag for transporting plants or flower bouquets, in particular bouquets in water pouch, in particular for transport by foot, by car, by train or the like.

"Flower bouquet or plants," here, means all bouquets of any shapes and styles, fresh, dried, artificial flowers or lyophilized flowers or treated dry flowers, green plants, with flowers or without flowers, with fruit or without fruit, ligneous or herbaceous, shrubs, bonsais, whether with or without roots or stems, planted in moss or soil or contained in water pouches or the like. The term "flower bouquet or plants" will designate the above elements in this application.

"Bouquet in a pouch," here, means flower bouquets whose stems or roots are contained in a bag filled with water and the like.

DETAILED DESCRIPTION OF THE INVENTION

The invention concerns a bag for transporting plants and flower bouquets, in particular bouquets in a water pouch comprising a receiving support for the bouquet or the plant, forming the bottom of the bag, so as to stabilize the bouquet or the plant.

The support is surmounted by two lateral portions 3, foldable and substantially parallel in closed position, comprising at least one cutout over at least one of the lateral portions, adapted not to crush the flowers and/or the leaves of the bouquet or of the plant.

The receiving support according to the invention makes it possible to receive the flower/plant pot, or the stems of the bouquet or else the water pouch in the case of a bouquet in a pouch. This makes it thus possible to stabilize the bouquet or the plant during transport. In the case of transport in a vehicle of a bouquet in a pouch, the driver can brake or turn without being afraid of upsetting the water pouch of the bouquet.

The receiving support according to the invention is in the shape of a rectangle, square, disk, rhombus, trapezoid, or any adapted shape.

The depth of the support depends on the volume of the bouquet or of the plant and is adapted thereto.

The two lateral portions are substantially parallel in closed position and independent form each other, and the portions are spaced apart from each other by substantially the width of the support.

In order to be able to insert the bouquet or the plant between the lateral portions, the user separates the portions (the bag is in so-called "open" position) and disposes the bouquet or the plant in the support.

In a particular embodiment, the lateral portions are detachable from the receiving support, which makes it possible, after transporting, to keep only the support of the bag while throwing away the lateral portions and to present the bouquet or the plant on its support.

The cutout over at least one of the lateral portions makes it possible for the bouquet or the plant to unfold outside of the bag, so as not to crush its flowers or its leaves with the lateral portions.

It has any possible shapes (round, oval, star-shaped, rhombus-shaped, etc.) according to the choice of the bag manufacturer.

In another particular embodiment, the cutout over at least one lateral portion comprises an interruption of the cut, so as to create a flap.

This flap folds down over the flowers or the leaves that stick out of the lateral portions, so as to cover them and to protect them.

In another particular embodiment, the bag according to the invention can comprise at least one handle integral with at least one of the two lateral portions.

Preferably, the bag comprises two integral handles, each being integral with one lateral portion.

In a particular embodiment, the handles are connected to each other by fixing means of the string, raphia, ribbon, glue, staples, adhesive or analogous type, which thus defines a so-called "closed" position of the bag.

The handles can be made of rolled paper, cardboard, twine, string, raphia, wire, plastic, fabric, wicker or the like.

The height of the bag depends on the variety of the plant or the style of the bouquet (round bouquet, "L-shaped", triangular, linear, parallel, horizontal, conical bouquet, etc.). The person of the art will thus adapt the dimensions of the bag as a function of the height of the bouquet or of the plant.

The bag according to the invention is made in a material selected from cardboard, reinforced paper, fabric, plastic, wicker and other synthetic products.

The bag can also comprise inscriptions, advertising on the support or on the lateral portions, for any marketing action.

Other characteristics and advantages of the invention will be better understood in reading the following description, in reference to the annexed drawings in which.

EXAMPLES

Figure 1:
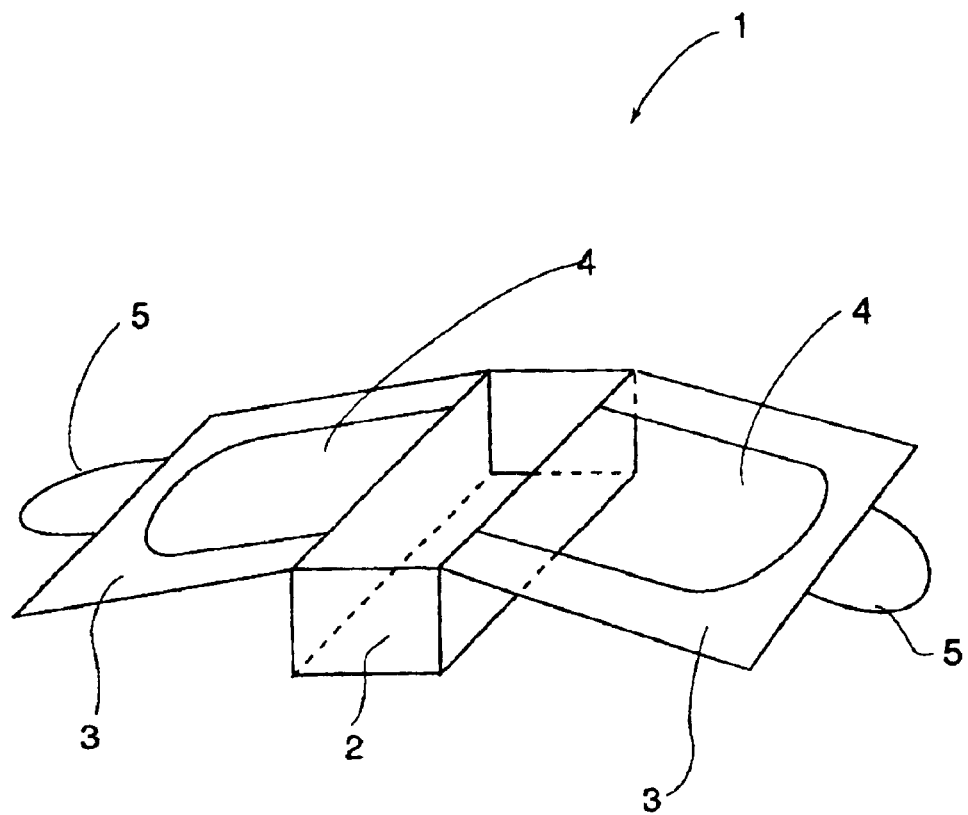
FIG. 1 shows the bag according to the invention in an "open" position.

FIG. 1 shows an "open" bag 1. The bottom of the bag is a paper receiving support 2 in the shape of a rectangular box, surmounted by two substantially parallel paper lateral portions 3, disposed along the length of the support.

The bag also comprises two handles 5, each being carried by a lateral portion 3.

Each of the lateral portions 3 comprises a cutout 4 in the shape of an inverted "U" and are spaced apart from each other so as to insert, for example, a flower bouquet in a water pouch.

Figure 2:
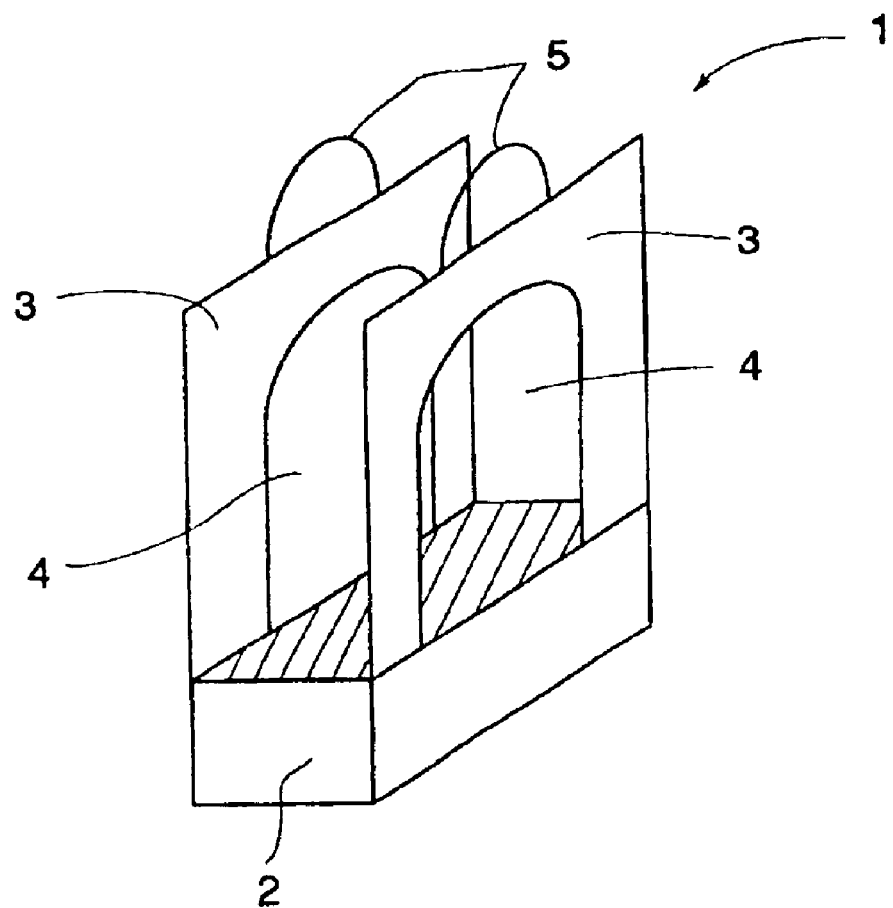
FIG. 2 shows the bag according to the invention in a "closed" position.

Once the bouquet has been placed in the bottom of the support 2, the lateral portions 3 are turned up to be set together, which defines a "closed" position of the bag (see FIG. 2).

Figure 3:
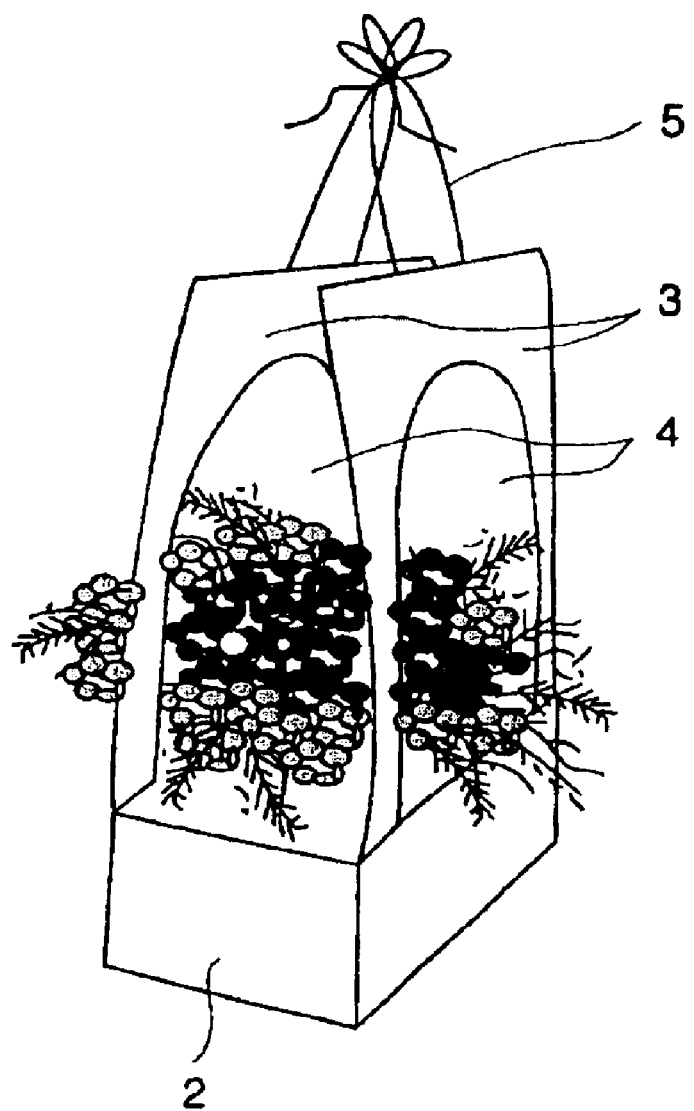
FIG. 3 shows the bag according to the invention in a "closed" position, the bag being equipped with a flower bouquet and a tie connecting the two handles.

On FIG. 3, the lateral portions 3 are tied by means of a ribbon, which defines a "closed" position of the bag and makes it possible to transport it in total security without the risk of upsetting the bouquet, or to seize it when it is disposed on a support.

Figure 4:
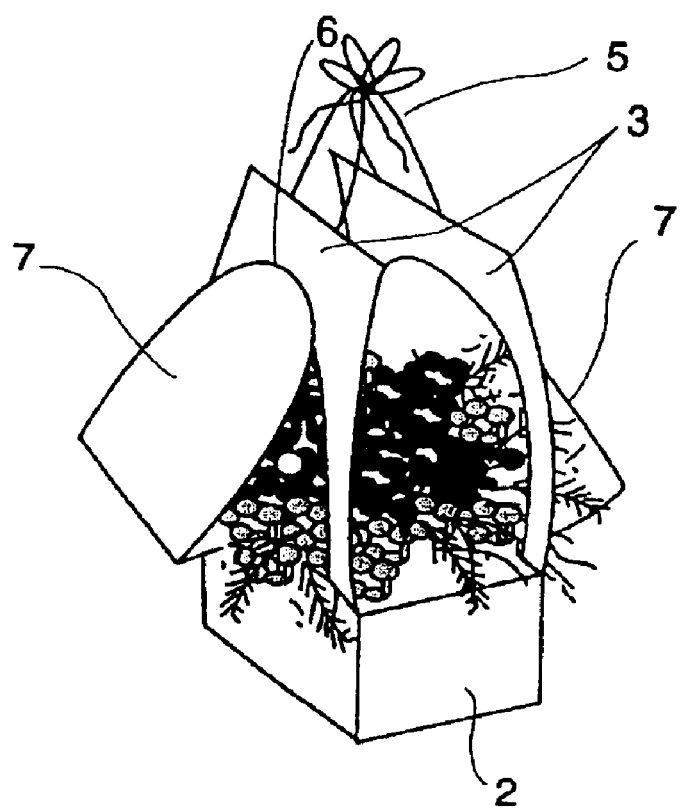
FIG. 4 shows the bag according to the invention, equipped with a flower bouquet and two flaps.

On FIG. 4, the cutout 4 on each lateral portion 3 comprises an interruption 6 of the cut in the area of the curved part of the inverted "U", so as to form a flap 7 on each of the portions 4. These flaps 7 make it possible to hide the bouquet or the plant without crushing the flowers and/or the leaves, so that the person to whom the bouquet is intended does not see the bouquet before opening the bag.

The invention also concerns articles such as flower bouquets, plants and the like packaged in the bag, in order to serve as a gift, decoration, or analogous objects.

The invention also covers any embodiment and any application which will be directly accessible to a person of the art after reading the present specification, and on his or her own knowledge.

What is claimed is:

1. Article comprising a bag and a plant or a flower bouquet packaged in the bag for transporting said plant or a flower bouquet, comprising:
    a single receiving support for the bouquet or the plant, said receiving support having a depth forming a single receptacle having a contiguous sidewall at the bottom of the bag, so as to stabilize said bouquet or said plant,
    two lateral portions attached and foldably hinged at a top edge of the contiguous sidewall of the receiving support and substantially parallel in closed position, and
    at least one cutout over at least one of the lateral portions, adapted so as not to crush the flowers and/or leaves, wherein the cutout comprises an interruption of the cut at a top portion of the cutout, so as to create a flap; wherein the flap has a fold to fold down over the flowers and/or leaves; and at least one handle above the cutout and integral with at least one of the two lateral portions.

2. Article according to claim 1, wherein the lateral portions are detachable from the receiving support.

3. Article according to claim 2, comprising at least one handle integral with at least one of the two lateral portions.

4. Article according to claim 3, comprising two integral handles, each being integral with one lateral portion.

5. Article according to claim 1, comprising two integral handles, each being integral with one lateral portion.

6. Article according to claim 5, wherein the handles are in rolled paper, cardboard, twine, string, raphia, wire, plastic, fabric, wicker.

7. Article according to claim 1, wherein the handles are connected to each other by fixing means of the string, raphia, ribbon, glue, staples, or adhesive type.

8. Article according to claim 7, wherein the handles are in rolled paper, cardboard, twine, string, raphia, wire, plastic, fabric, wicker.

9. Article according to claim 1, wherein the handles are in rolled paper, cardboard, twine, string, raphia, wire, plastic, fabric, wicker.

10. Article according to claim 1, wherein the receiving support is in the shape of a rectangle, square, disk, rhombus or trapezoid.

11. Article according to claim 1, which is made in a material selected from cardboard, reinforced paper, fabric, plastic, wicker and other synthetic products.

12. Article comprising a bag and a plant or a flower bouquet packaged in the bag for transporting said plant or a flower bouquet, comprising:
    a receiving support for the bouquet or the plant, said receiving support having a depth forming a receptacle at the bottom of the bag having a contiguous sidewall at the bottom of the bag, adapted so as to stabilize a bottom part of said bouquet or said plant disposed in said receiving support, and
    two lateral portions attached and foldably hinged at a top edge of the receiving support and substantially parallel in closed position, and
    at least one cutout over at least one of the lateral portions, adapted so as not to crush the flowers and/or the leaves sticking out of the lateral portions, wherein the cutout comprises an interruption of the cut at a top portion of the cutout, so as to create a flap that sticks out of the lateral portion toward the outside of the bag so as to cover the flower and/or the leaves of said plant or flower bouquet; wherein the flap has a fold to fold down over the flowers and/or leaves; and at least one handle above the cutout and integral with at least one of two lateral portions.

13. Article according to claim 12, wherein the lateral portions are detachable from the receiving support.

14. Article according to claim 12, comprising two integral handles, each being integral with one lateral portion.

15. Article according to claim 12, wherein the handles are connected to each other by fixing means of the string, raphia, ribbon, glue, staples, or adhesive type.

16. Article according to claim 12, wherein the handles are in rolled paper, cardboard, twine, string, raphia, wire, plastic, fabric, wicker.

17. Article according to claim 12, wherein the receptacle has a contiguous sidewall, and the two lateral portions are attached and foldably hinged at a top edge of the contiguous sidewall of the receiving support.

* * * * *